2 Sheets—Sheet 1.

S. SHEPHERD & A. M. GEORGE.

MACHINE FOR POLISHING ENAMELED PAPER.

No. 3,203. Reissued Nov. 17, 1868.

Witnesses:

J. W. Coombs

J. W. Reed

Inventors:

S. Shepherd

A. M. George

THE NORRIS PETERS CO., PHOTO-LITHO., WASHINGTON, D. C.

2 Sheets—Sheet 2.
S. SHEPHERD & A. M. GEORGE.
MACHINE FOR POLISHING ENAMELED PAPER.
No. 3,203. Reissued Nov. 17, 1868.
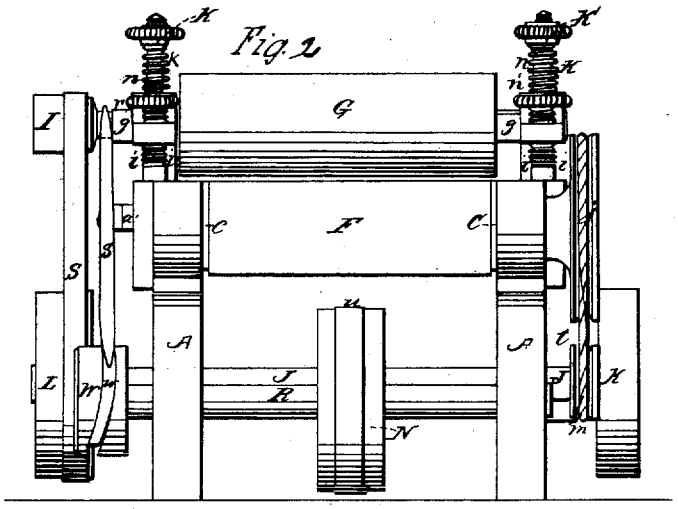
Witnesses:
J. M. Combs
G. W. Reed
Inventors:
S. Shepherd
A. M. George
THE NORRIS PETERS CO., PHOTO-LITHO., WASHINGTON, D. C.

United States Patent Office.

SAMUEL SHEPHERD AND JOSEPH GREELEY, OF NASHUA, NEW HAMPSHIRE, ASSIGNEES, BY MESNE ASSIGNMENTS, OF SAMUEL SHEPHERD AND AMMI M. GEORGE.

*Letters Patent No.* 56,457, *dated July* 17, 1866; *reissue No.* 3,203, *dated November* 17, 1868.

IMPROVED MACHINE FOR POLISHING ENAMELLED PAPER.

The Schedule referred to in these Letters Patent and making part of the same.

*To all whom it may concern:*

Be it known that the following is a full, clear, and exact description of certain new and useful Improvements in Machines for Polishing Enamelled Paper and other materials, invented by SAMUEL SHEPHERD and AMMI M. GEORGE, both of Nashua, in the county of Hillsborough, and State of New Hampshire, reference being had to the accompanying drawing, forming part of this specification, and in which—

Figure 1:
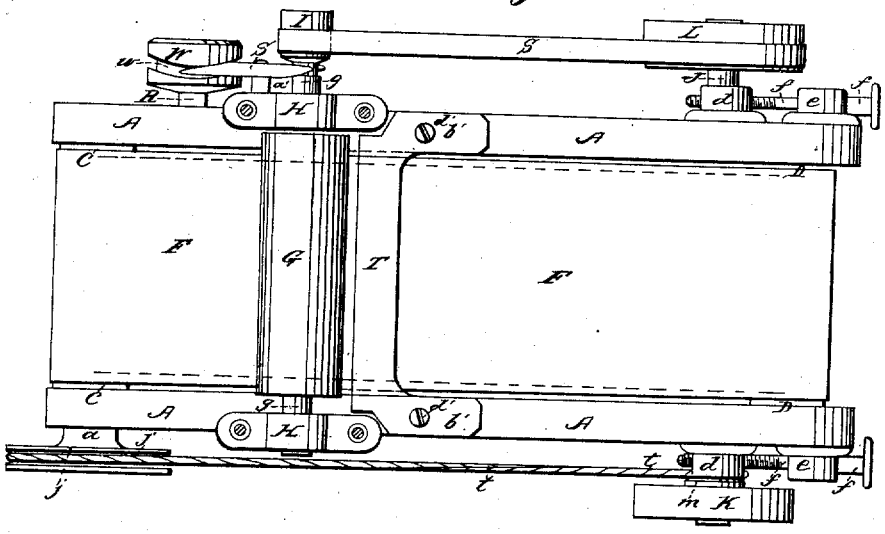

Figure 1 represents a plan or top view of a machine constructed in accordance with said improvements;

Figure 2, an end elevation thereof; and

Figure 3:
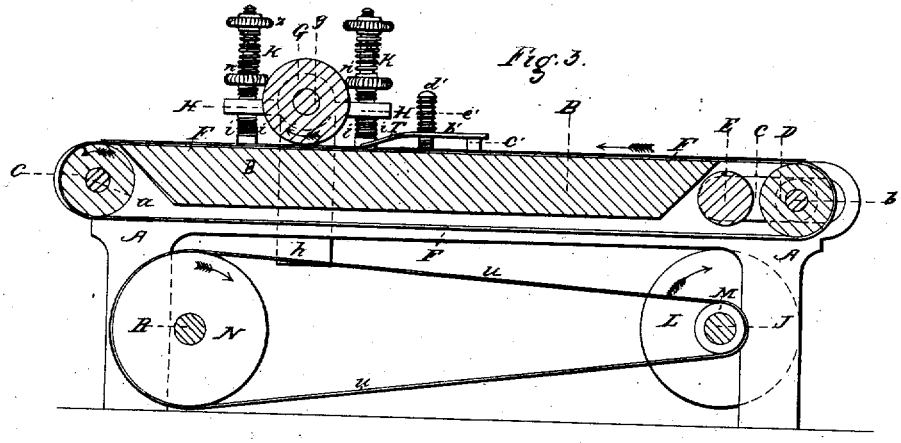

Figure 3, a central vertical longitudinal section.

This invention consists in the combination of a rotary polishing-device, travelling at any required velocity, with an endless carrying-device, moving at a lower velocity than the polishing-device, and supporting-table, bed, or ways to the latter, in such manner that the paper or material to be polished, being carried underneath the rotary polishing-device, has its enamelled surface subjected to the frictional rubbing-action of the said device, whereby it is polished or burnished much more rapidly and efficiently than by the means ordinarily employed.

Likewise, the invention consists in a combination, with an endless carrying-device to the paper or other material to be acted on, of a polishing-device, arranged to reciprocate across the line or plane of feed.

The invention also consists in a novel means of insuring the proper position of the paper or material during its passage to the rotary polishing-device, and of preventing the formation of ridges or creases therein during the operation of polishing the same.

The invention further consists in a novel means of securing an efficient bearing of the rotary polishing-device upon the paper or material during the polishing-operation.

In the machine, when constructed as represented in the accompanying drawing, A is a frame, which supports the working parts, and on the upper side or top of which is secured a flat horizontal table, B, which is here shown as occupying the entire central part of the aforesaid top of the frame A.

At the rearmost end of this table B, with the ends of its shaft, *a*, working in suitable bearings in the sides of the frame A, is a transverse roller, C, upon one end of the shaft of which is fixed a pulley or belt-wheel, *j*, while situated at the opposite or front end of the said table is a similar transverse roller, D, which has the ends of its shaft, *b*, working in sliding-journal boxes, which are placed in suitable longitudinal slots or recesses, *c*, formed, one in each side of the frame A, at the front end thereof.

E is a transverse bar, situated behind the roller D, and the ends of which project outward, through the aforesaid slot C, as shown at *d*, in fig. 1.

*e e* are two knobs or brackets, situated at the front end of the frame A, one at each side thereof. A horizontal screw, *f*, passes through a suitable hole in each of the brackets *e*, and back through the outwardly-projecting ends *d* of the transverse bar E, and inasmuch as the ends of the transverse bar E are situated behind the sliding bearings of the roller D, it follows that, by turning the screws *f*, so as to bring the transverse bar E forward or outward, the aforesaid sliding bearings, and consequently the roller D, will be brought forward, while, by turning the said screws in a contrary direction, the bar E, and consequently the roller D, will be allowed to move inward, toward the table B.

Placed upon the rollers C D, and with its upper part resting upon and supported by the table B, is an endless apron, F, which is made of India rubber, felt, velvet, or other elastic material, and the tension of which is adjusted by means of the screws *f* and bar E, as just bereinbefore explained.

G represents a rotary polishing or burnishing-device, which may have its outer surface or periphery hard or soft, according to the work to be done, but is here supposed to be made of iron, with a chilled surface, or of steel, and which is situated transversely to the feed, or, as here represented, across and over the table B, near its one end, and, of course, above the endless carrying-device, or, in other words, supposing the latter to be an endless apron, F, as shown, above the uppermost surface of said apron.

The ends of the shaft *g* of this rotary polishing-device, G, are shown as working in yielding and adjustable journal-boxes or bearings, H, which are situated, one at each side of the frame A.

A vertical quadrangular stem, *h*, projects downward from the centre of each bearing, H, into a suitable vertical slot in the side of the frame A, and serves to steady the bearing.

Passing through each end of each bearing, and with its lower extremity resting upon the upper surface of the side of the frame A, is a hollow screw, *i*, and passing down through each hollow screw, *i*, with its lower end screwed into the frame A, is a solid screw, *k*, while placed around each of the screws *k*, between the head thereof and the top of the hollow screw through which it passes, is a spiral spring, *n*.

The appurtenances of the bearings H being thus arranged, the height of the rotary polishing-device, with reference to the endless carrying-device, may be adjusted by turning the hollow screws *i*, while the downward pressure of the springs *n*, to press the said rotary polishing-device upon the upper surface of the paper or material as it is carried underneath it by the endless carrying-device, may be adjusted by turning the screws *k*.

The length of the rotary polishing-device is shown as less than the distance between the bearings H, in order that sufficient room may be allowed to admit of said rotary device having a reciprocating movement, as will be presently further explained.

One end of the shaft *g* of the rotary polishing-device projects outwards, beyond its bearing, and has fixed upon it a pulley, and formed around the said end of the shaft *g*, at the inner end of the pulley I, is an annular groove, *r*.

J is a transverse shaft, which is situated in the front or forward end of the frame A, and which is furnished at one end with a driving pulley, K, and also with a small pulley, *m*, and at the other end with a pulley, L, which is connected by a belt, *s*, with the pulley I of the rotary polishing-device, while a band, *t*, extends from the small pulley *m* to the pulley J, on the rearmost roller, C.

Situated in the centre of the shaft J is a small band-wheel, M, which is connected by a belt, *u*, with a larger band-wheel, N, that is fixed in the centre of a transverse shaft R, situated in the rearmost end of the frame A, at the lower part thereof. One end of this shaft R projects out beyond the side of the frame A, and has fixed upon it a thick wheel or disk, W, in and around the circumference of which is a cam-groove, *w*.

S is a lever, which is pivoted at or near its centre upon a pin, *a'*, which projects out from the side of the frame A. The upper end of this lever S is forked, and fitted into the groove *r*, in the shaft of the rotary polishing-device, while the lower end, being also forked, is fitted into the cam-groove *w*, in the circumference of the wheel W, in such manner that the rotation of the said wheel W, by vibrating the lever S, communicates a longitudinal-reciprocating movement to the rotary polishing-device.

T is an elastic pressing-plate or blade, which is placed transversely over the endless carrying-device, in front of the rotary polishing-device, and in an inclined position, as shown more clearly in fig. 3. Projecting forward from each end of this pressing-plate T is a flat arm, *b'*, the forward extremity of which rests upon a stud or spur, *c'*, while near the inner ends thereof is a hole, through which is passed a fixed vertical screw, *d'*. Between the heads of these screws, *d'*, and the upper sides of the arms *b'*, are spiral springs, *e'*, which press the rear or lower edge of the pressing-plate T down upon the paper or material as it passes to the rotary polishing-device, as will be presently further set forth.

A small roller may be attached lengthwise to the rear or pressing-edge of this pressing-plate, if desired, to diminish its friction upon the paper or material.

Instead of making the endless carrying-device, here illustrated by the endless apron F, elastic, as set forth, the same may be made of non-elastic material, and, if desired, the upper surface of the supporting table, or other base to the endless carrying-device, may be made elastic, whereby a proper bearing of the rotary polishing-device upon the surface of the paper or material is obtained in the same manner as when the endless carrying-device is itself elastic.

Furthermore, the said rotary polishing-device may be rotated, if desired, in a direction opposite to the movement of the endless carrying-device, with the same result as when moving in the same direction thereon.

The paper or material to be polished, in the form of long sheets or pieces, is placed, with its enamelled surface upwards, upon the forward portion of the endless carrying-device, and is carried back, first under the pressing-plate T, which spreads it out evenly, and then under the rotary polishing-device, which, being pressed down upon the paper or material by the springs *n*, and revolving at a much higher velocity than that of the paper as it is carried back by the endless carrying-device, polishes or burnishes the upper and enamelled surface of the paper or material.

When the endless carrying-device is made elastic, it causes the paper or material to bend somewhat around the under side of the rotary polishing-device, as it passes underneath the same, and thus keeps it in contact with a much greater proportion of the surface of the said polishing-device than if the paper or material were kept perfectly flat while passing under the same, whereby a very efficient action of the said rotary polishing-device upon the paper or material is obtained. At the same time the reciprocating movement of the rotary polishing-device, produced simultaneously with its revolving motion, by means of the cam-lever W and lever S, as hereinbefore explained, prevents the formation of ridges or creases in the paper or material, which would be likely to occur if such reciprocating movement of the rotary polishing-device were dispensed with.

What is here claimed, and desired to be secured by Letters Patent, is—

1. The combination of a rotary polishing-device with an endless carrying-device, moving at a lower velocity than the polishing-device, and supporting-table, bed, or ways to the carrying-device, substantially as herein set forth, for the purpose specified.

2. The combination, with an endless carrying-device to the paper or other material to be operated on, of a polishing-device, arranged to reciprocate across the line or plane of feed, substantially as specified.

3. Providing an elastic bearing for the paper or material under the rotary polishing-device, by making either the endless carrying-device, or support upon which it rests, elastic, substantially as herein set forth.

4. Giving the rotary polishing-device a reciprocating movement transversely to the feed, as produced by the endless carrying-device, simultaneously with its rotary motion, substantially as herein set forth, for the purpose specified.

5. The pressing-plate T, applied in relation with the rotary polishing-device, and endless carrying-device, and support or ways to the latter, substantially as herein set forth, for the purpose specified.

SAMUEL SHEPHERD.
JOSEPH GREELEY.

Witnesses:
MARY E. SHEPHERD,
SAM'L T. WORCESTER.